Oct. 13, 1942.　　　C. F. FREDE　　　2,298,286
RAILWAY TRUCK STRUCTURE
Filed June 14, 1940　　　2 Sheets-Sheet 1

INVENTOR.
CHARLES F. FREDE
BY
Rodney Bedell
ATTORNEY.

Oct. 13, 1942.  C. F. FREDE  2,298,286
RAILWAY TRUCK STRUCTURE
Filed June 14, 1940  2 Sheets-Sheet 2

INVENTOR.
CHARLES F. FREDE
BY Rodney Bedell
ATTORNEY.

Patented Oct. 13, 1942

2,298,286

UNITED STATES PATENT OFFICE 2,298,286

RAILWAY TRUCK STRUCTURE

Charles F. Frede, University City, Mo., assignor to General Steel Castings Corporation, Granite City, Ill., a corporation of Delaware Application June 14, 1940, Serial No. 340,484

5 Claims. (Cl. 105—208.1)

The invention relates to railway truck structure and more particularly to arrangements in which brake cylinders and pistons are provided for each wheel adjacent the outer face thereof.

One object of the invention is to simplify equalized railway truck structure without sacrificing the easy riding qualities now possessed by the familiar type of passenger car truck with equalizers resting on journal boxes and bolster supporting frames including wheel pieces extending over the journal boxes and spring supported on the equalizers and carrying brake rigging.

Another object of the invention is to simplify the assembly and disassembly of the braking structure with the remainder of the truck structure and to facilitate the renewal and replacement of brake parts.

Another object of the invention is to simplify the application of the brakes and to eliminate the cumbersome hangers, brake beams, operating levers and connections present in the ordinary railway brake rigging.

Another object of the invention is to arrange the brake shoes and brake operating gear so that they are movable with the wheel and thereby avoid undue play between the wheel and the brake gear.

The above and other detail objects are attained by the structure illustrated in the accompanying drawings in which—

Figure 1:
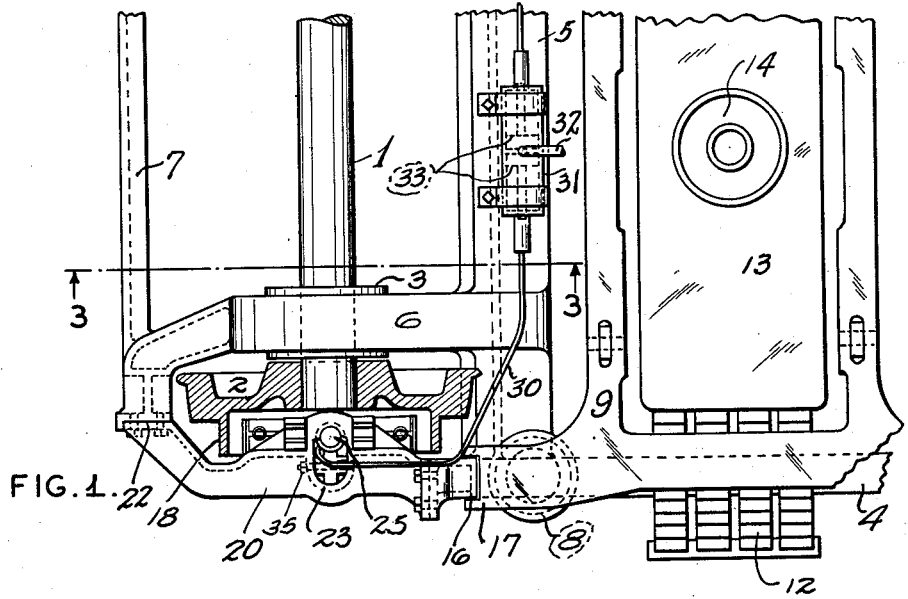
Figure 1 is a top view of one quarter of a four wheel equalized truck with brake arrangement embodying one form of the present invention, parts of the structure being sectioned horizontally to more clearly illustrate the construction.
Figure 2:
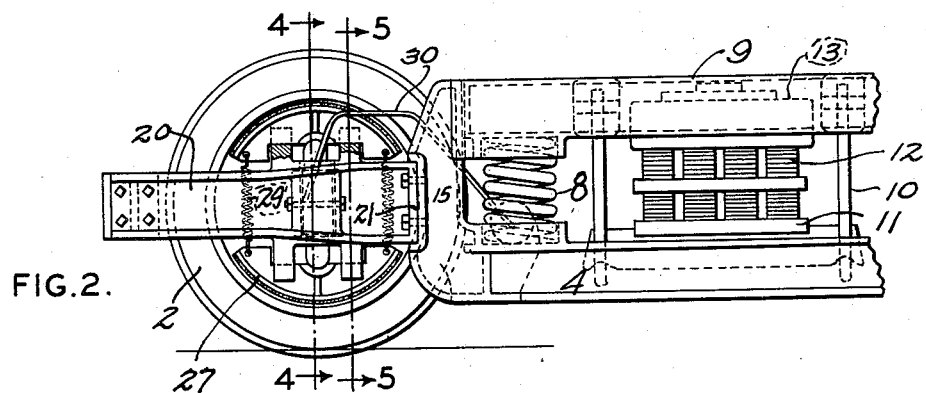
Figure 2 is a side elevation of the structure shown in Figure 1.
Figure 3:
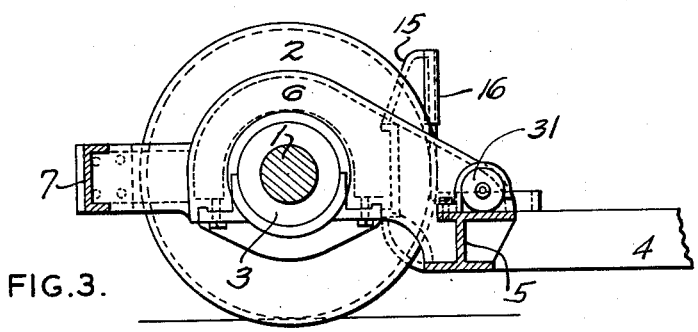
Figure 3 is a vertical longitudinal section taken on the line 3—3 of Figure 1.
Figure 4:
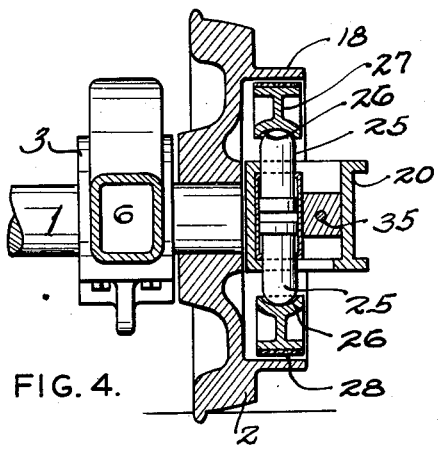
Figures 4 and 5 are detail vertical transverse sections taken on the corresponding section lines of Figure 2.
Figure 5:
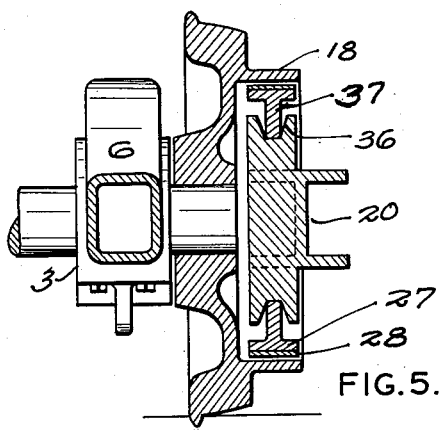
Figure 6:
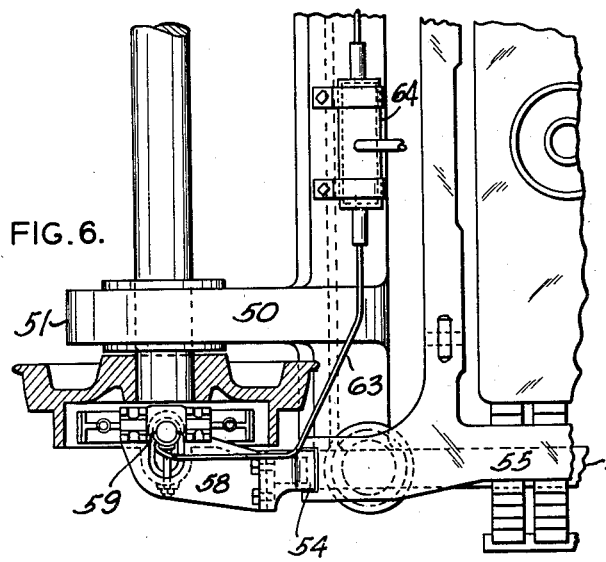
Figure 7:
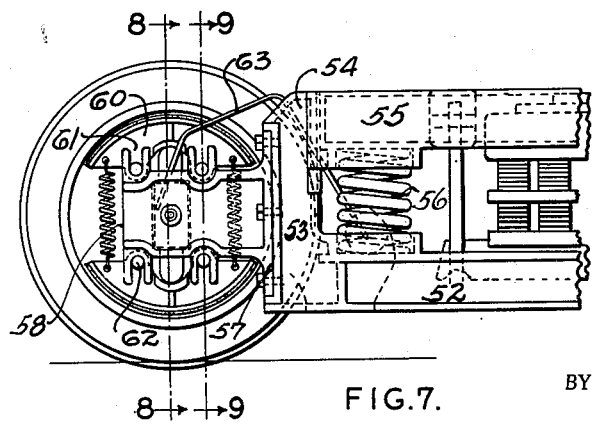

Figures 6 and 7 correspond to Figures 1 and 2 but illustrate another form of the invention.

Figure 8:
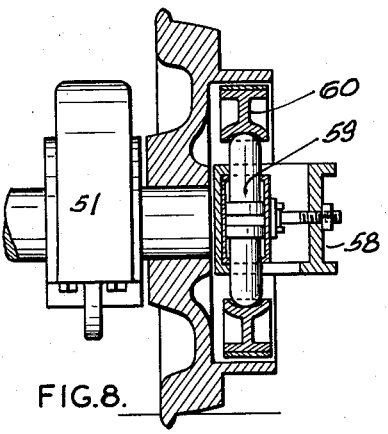
Figure 9:
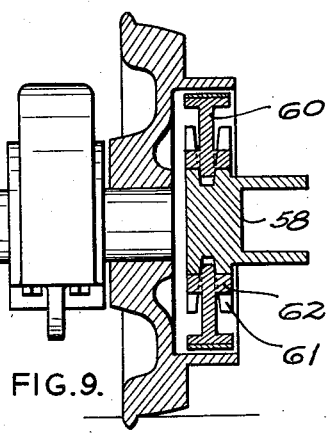

Figures 8 and 9 are detail vertical sections taken on the corresponding section lines of Figure 7.

The truck axles 1 mount wheels 2 and are journalled in inside bearings 3 mounted in a rigid equalizer frame structure, preferably a unitary casting, comprising outer side members 4, extending substantially between the wheels, transverse transoms 5, inner side members 6 extending from transoms 5 and toward the ends of the truck where they are joined by transverse end members 7. Members 6 mount journal bearings 3 and the frame forms an equalizer between the spaced axles of the truck and mounts coil springs 8 which support a rectangular frame 9 from which are pivotally suspended links 10 supporting the usual spring plank 11 and bolster springs 12 which carry the truck bolster 13, having a center plate 14 mounting the vehicle body bolster (not shown). Outer side members 4 terminate in uprights 15 having guide elements 16 received in suitable jaws 17 in frame 9 to hold the latter against movement longitudinally or horizontally of the truck while permitting relative vertical movement of frame 9 and the equalizer frame 4, 5, 6, 7 under the action of springs 8.

Each wheel is provided with a drum 18.

A brake unit is detachably assembled with each wheel and the adjacent equalizer frame parts and includes a bracket 20 with its ends seated in pockets 21 and 22 provided in upright 15 and member 6 respectively. Bracket 20 includes a chamber 23 with an opening at its upper end adapted to accommodate the insertion into the chamber of a hydraulic cylinder 24, with double-acting pistons 25, which may then be moved laterally of the bracket towards the wheel so that the ends of the pistons may be seated in recesses 26 provided therefor in the spaced brake shoes 27 having removable linings 28 for contact with wheel drum 18. Coil springs 29 hold shoes 27 in assembled relation with the pistons, cylinder and bracket 20 during assembly and disassembly and pull the shoes away from the drum when the brakes are released. Bracket 20 and shoes 27 have interengaging elements 36 and 37 respectively forming stops or guides to keep the shoes in alignment with the brake drum and other brake parts.

A bolt 35, or like device, is provided to hold cylinder 24 and associated parts in assembled position. Upon removal of bolt 35, the cylinder may be moved laterally and upwardly for removal from bracket 20. Upon removal of the bolts holding bracket 20 to the frame parts, the bracket and the brake shoes mounted thereon may be removed from the other parts of the truck.

A conduit 30 connects each cylinder 24 with a master cylinder 31 preferably mounted on transom 5 and having an air line connection 32 to an air reservoir (not shown) on the vehicle body whereby air under pressure may be admitted to cylinder 31 by the reduction of the train line pressure as in the usual air brake system. Master cylinder 31 may be connected to the two wheels at one end of the truck or to all four wheels on the truck, and the cylinder is provided with air operated pistons 33 for applying pressure to hydraulic fluid in the master cylinder, conduits 30 and hydraulic cylinders 24 to actuate the brake pistons 25. If desired, individual air and hydraulic cylinders may be substituted for hydraulic cylinders 24, in which case the master cylinder would be omitted. Forms of the master cylinder and hydraulic cylinder construction are illustrated and described in application, Serial No.

314,432, filed by the present applicant and Emil J. Schleicher January 18, 1940.

In the form of the invention shown in Figures 6-9 the inner side member 50 of the equalizer frame structure terminates with the axle bearing 51, and there is no transverse end member as indicated at 7 in Figure 1. The outer side member 52 terminates in an upright 53 forming a guide 54 for the bolster supporting frame 55 which is supported on member 52 by springs 56. Upright 53 also forms a seat 57 for the brake assembly bracket 58 which extends from the end of member 52 far enough to mount the braking units 59 and the brake shoes 60, but does not extend around the wheel to connect with the equalizer frame at the end of the truck, as shown in Figure 1.

Bracket 58 has vertical slots 61, and pins 62 extend transversely through slots 61 and through the shoes to slidably mount the shoes in the bracket.

The type of braking unit used is not essential to either form of the invention illustrated. Both forms of the invention have the common feature of a rigid equalizer frame structure including outer and inner side members with uprights which form guides for the bolster supporting frame and which rigidly support a brake assembly applicable to and removable from the wheel as a unit without disassembling other truck parts. This provides for the ready removal of the brake shoes. In addition, the braking units 25 and 59 may be removed independently of the shoes and without disassembling the bracket. Some features of the construction herein disclosed and claimed are embodied in other truck and brake arrangements covered by a companion application filed herewith by the present applicant and bearing Serial No. 340,485.

The structure attains the advantages set forth in the introductory portion of the specification irrespective of the details described, which are illustrative only, and the exclusive use of such modifications of the structure as come within the scope of the claims is contemplated.

What is claimed is:

1. In a railway truck, wheels and axles, an equalizer framing comprising members extending longitudinally of the truck adjacent the inner faces of said wheels and mounted on said axles, transverse members extending between said longitudinal members and beyond the latter, and members extending longitudinally of the truck between said transverse members and positioned outwardly of the vertical plane of said wheels, the outer ends of the equalizer framing outer longitudinal members forming upright guides, there being a truck frame spring-supported on said outer members and slidably engaging said guides, and a vehicle body supporting bolster carried on said frame and movable thereon laterally of the truck.

2. In a railway truck, wheels, axles, journal bearings thereon, framing extending between adjacent axles and equalizing the load thereon and comprising members extending lonigtudinally of the truck adjacent the inner faces of said wheels and including integral portions extending over and forming pockets receiving the axles and journal bearings, transverse members extending between said first-mentioned members and beyond the latter, and members extending longitudinally of the truck between said transverse members and outwardly beyond the vertical plane of said wheels and forming seats for load-supporting springs, said first-mentioned longitudinal members adjacent the inner faces of the wheels terminating at said transverse members, there being a spring-mounted load-supporting structure extending from side to side of the truck and carried on the equalizing framing, the cross pieces of said load-supporting structure being positioned between said transverse members and the sides of said load-supporting structure being positioned between the ends of said outer longitudinal members.

3. In a railway truck, wheels, axles, journal bearings thereon, framing extending between adjacent axles and equalizing the load thereon and comprising members extending longitudinally of the truck adjacent the inner faces of said wheels and including pockets extending over and receiving said axle journal bearings, transverse members extending from side to side of the truck between the inner ends of said first-mentioned members and laterally of the truck beyond said first-mentioned members, and members extending longitudinally of the truck between the outer ends of said transverse members and positioned outwardly of the vertical planes of said wheels, a truck load-carrying frame positioned between said transverse members and extending over said latter-mentioned longitudinal members, and springs supporting said load-carrying frame on the end portions of said latter-mentioned longitudinal members.

4. A one-piece cast metal frame for receiving load from a truck bolster and equalizing it to spaced axles and including end portions each comprising longitudinal parallel members and an intermediate portion comprising longitudinal parallel members spaced apart a greater distance than said end portions and positioned at a lower level than said end portions, said first-mentioned longitudinal members being formed with downwardly opening pockets for receiving axles and axle bearings and said second-mentioned longitudinal members being formed with upwardly facing seats at their ends, transverse members extending from side to side of the framing and connecting the ends of said second-mentioned longitudinal members.

5. A one-piece cast metal frame for receiving load from a truck bolster and equalizing it to spaced axles and including end portions each comprising longitudinal parallel members and an intermediate portion comprising longitudinal parallel members spaced apart a greater distance than said end portions and positioned at a lower level than said end portions, said first-mentioned longitudinal members being formed with downwardly opening pockets for receiving axles and axle bearings and said second-mentioned longitudinal members being formed with upwardly facing seats at their ends, transverse members extending from side to side of the framing and connecting the ends of said second-mentioned longitudinal members, said framing including upstanding guides at the outer ends of said intermediate longitudinal members for engagement with a load-supporting structure spring-supported on said frame.

CHARLES F. FREDE.